United States Patent
Ryoo et al.

(10) Patent No.: US 11,777,842 B2
(45) Date of Patent: Oct. 3, 2023

(54) METHOD AND APPARATUS FOR CONTROLLING TRANSMISSION FOR LOSSLESS PACKET FORWARDING

(71) Applicant: ELECTRONICS AND TELECOMMUNICATIONS RESEARCH INSTITUTE, Daejeon (KR)

(72) Inventors: Yeoncheol Ryoo, Daejeon (KR); Jeong-Dong Ryoo, Daejeon (KR); Taesik Cheung, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 88 days.

(21) Appl. No.: 17/517,365

(22) Filed: Nov. 2, 2021

(65) Prior Publication Data

US 2022/0141128 A1    May 5, 2022

(30) Foreign Application Priority Data

Nov. 3, 2020 (KR) .................. 10-2020-0145450

(51) Int. Cl.
  *H04L 45/28*  (2022.01)
  *H04L 47/32*  (2022.01)
  *H04L 45/24*  (2022.01)
  *H04L 1/22*   (2006.01)
  *H04L 45/00*  (2022.01)
  *H04L 1/18*   (2023.01)

(52) U.S. Cl.
  CPC ............ *H04L 45/28* (2013.01); *H04L 1/18* (2013.01); *H04L 1/22* (2013.01); *H04L 45/22* (2013.01); *H04L 45/24* (2013.01); *H04L 47/32* (2013.01)

(58) Field of Classification Search
  CPC ......... H04L 45/22; H04L 45/24; H04L 47/32; H04L 1/08
  See application file for complete search history.

(56) References Cited

U.S. PATENT DOCUMENTS

| | | | |
|---|---|---|---|
| 6,466,574 B1 | 10/2002 | Fujisaki et al. | |
| 9,743,401 B2 | 8/2017 | Kim et al. | |
| 9,763,248 B2 | 9/2017 | Kim et al. | |
| 10,505,851 B1* | 12/2019 | Matthews | H04L 47/215 |
| 2014/0328165 A1 | 11/2014 | Ryoo et al. | |
| 2015/0365319 A1* | 12/2015 | Finn | H04L 41/0668 370/221 |
| 2019/0342201 A1 | 11/2019 | Singh | |
| 2020/0106710 A1 | 4/2020 | Ryoo et al. | |
| 2021/0126865 A1* | 4/2021 | Etla | H04L 41/0668 |
| 2021/0273880 A1* | 9/2021 | Montero | H04L 45/16 |

FOREIGN PATENT DOCUMENTS

KR    10-1660750 B1    9/2016

* cited by examiner

*Primary Examiner* — Donald L Mills
(74) *Attorney, Agent, or Firm* — LRK PATENT LAW FIRM

(57) ABSTRACT

In the apparatus for controlling a transmission for lossless packet forwarding, when a failure is detected on one of a plurality of forwarding paths set between a transmitting node and a receiving node, packet transmission of a flow associated with the path in which the failure occurs is stopped, when the path in which the failure occurs is recovered, packet transmission of the flow is resumed, and the receiving node temporarily extends the bandwidth of the flow.

8 Claims, 6 Drawing Sheets

METHOD AND APPARATUS FOR CONTROLLING TRANSMISSION FOR LOSSLESS PACKET FORWARDING

CROSS-REFERENCE TO RELATED APPLICATION

This application claims priority to and the benefit of Korean Patent Application No. 10-2020-0145450 filed in the Korean Intellectual Property Office on Nov. 3, 2020, the entire content of which is incorporated herein by reference.

BACKGROUND OF THE INVENTION

1. Field of the Invention

The present invention relates to a method and apparatus for controlling transmission for lossless packet forwarding, and more particularly, as a type of network protection switching technology, relates to a method and apparatus for controlling transmission for lossless packet forwarding capable of seamlessly transmitting a packet even when a failure occurs or is recovery on a packet forwarding path.

2. Description of Related Art

Time-Sensitive Networking (TSN) of IEEE 802.1 and Deterministic Networking (DetNet) of IETF are time-determined high-reliability networking technologies that reliably guarantee packet delivery delay time and do not cause packet loss even in the event of a forwarding path failure.

The guarantee of packet delivery delay time is achieved by using an appropriate scheduling technique at each node of the network on the premise that the properties of traffic input to the network (e.g., packet transmission period, maximum packet size, etc.) are clearly defined. Each node in the network monitors the properties of individual traffic and stops packet transmission when it exceeds a predefined amount of traffic so that changes in the properties of certain traffic do not affect the latency quality of other traffic. A lossless forwarding technology that can forward traffic without packet loss even when a failure occurs or is in recovery in the forwarding path is defined as IEEE Std 802.1CB-2017 Frame Replication and Elimination for Reliability (FRER) in TSN, and is called Packet Replication and Reliability (PREF) in DetNet. Their basic operation method is the same as IEC 62439-3 High-availability Seamless Redundancy (HSR) and is as follows.

A plurality of forwarding paths are established between an ingress node that receives a packet into the network and an egress node that outputs a packet out of the network. At this time, the forwarding paths are separated from each other so that they are not disconnected at the same time when a failure occurs on a single forwarding path in the network. The ingress node inserts the sequence number into the overhead of the packet in the order of input of the packet and transmits it to the plurality of forwarding paths, and the egress node checks the sequence numbers of packets received from the plurality of forwarding paths, only outputs packets with the sequence number that is not already received out of the network, determines packets with the sequence number already received as duplicate packets, and deletes the packets.

In the conventional lossless forwarding technique, due to different delay times of the set forwarding paths, when a failure occurs in any one of the forwarding paths and the failure is recovered, the amount of traffic increases during a time corresponding to the delay time difference between the forwarding paths. This causes a problem in that the transmission of the corresponding traffic is stopped by monitoring according to the predefined traffic properties as described above.

This problem can be solved by making the delay times of a plurality of forwarding paths match at the receiving node through buffering, but as the network topology becomes more complex and the number of service flows increases, it is very difficult to adjust the buffering time by predicting the delay deviation of different forwarding paths, it cannot be applied if the network node does not have enough memory for buffering. In addition, this problem can be solved by monitoring based on a value of greater than a predefined amount of traffic at the receiving node, but there is a problem in that network resources are wasted in normal times as well as monitoring according to predefined traffic properties cannot be performed.

SUMMARY OF THE INVENTION

The present invention has been made in an effort to provide a method and apparatus for controlling transmission for lossless packet forwarding, that can be efficiently solved capable of solving the problem caused by an increase in the amount of traffic during a certain period of time immediately after a failure is recovery in a time-determined high-reliability network that reliably guarantees packet delivery delay time and does not cause packet loss even in the event of a forwarding path failure.

According to an embodiment of the present invention, a method for controlling a transmission for lossless packet forwarding in an apparatus for controlling a transmission for lossless packet forwarding in which a transmitting node duplicates packets, transmits them through a plurality of forwarding paths established between the transmitting node and a receiving node, and deletes duplicate packets at the receiving node is provided. The method for controlling a transmission for lossless packet forwarding includes: when a failure is detected on one of the plurality of forwarding paths, stopping packet transmission of a flow associated with the path in which the failure occurs at the node detecting the failure; when the failed path is recovered, resuming packet transmission of the flow associated with the path in which the failure occurs at the node detecting the failure; and temporarily extending the bandwidth of the flow at the receiving node.

The method for controlling a transmission for lossless packet forwarding may further include: receiving packets on the plurality of forwarding paths through the extended bandwidth at the receiving node; and changing the bandwidth to an original value at the receiving node.

The temporarily extending of the bandwidth may include extending the bandwidth of the flow for a time corresponding to a transmission delay deviation between the plurality of forwarding paths.

The plurality of forwarding paths may have different transmission delays. The method for controlling a transmission for lossless packet forwarding may further include detecting the failure based on a physical failure signal or end-to-end connectivity check on the forwarding path.

According to another embodiment of the present invention, an apparatus for controlling a transmission for lossless packet forwarding in which a transmitting node duplicates packets transmits them through a plurality of forwarding paths established between the transmitting node and a receiving node, and deletes duplicate packets at the receiving node is provided. The apparatus for controlling a transmission for lossless packet forwarding includes: when a failure is detected on at least one of the plurality of forwarding paths, a transmission controller that stops packet transmission transmitted to the path in which the failure is detected and resumes the stopped packet transmission upon recovery of the failure of the corresponding path; and when the packet transmission is resumed, a reception processor that temporarily extends the bandwidth of a flow in which packet transmission is stopped due to the failure and processes the packets received through the plurality of forwarding paths.

The apparatus for controlling a transmission for lossless packet forwarding may further include a failure detector that detects the failure on the plurality of forwarding paths.

The failure detector may detect the failure based on a physical failure signal or an end-to-end connectivity check.

The apparatus for controlling a transmission for lossless packet forwarding may further include a failure recovery detector that detects failure recovery of the path in which the failure is detected.

The reception processor may delete duplicate packets from packets received through the plurality of forwarding paths, and may change the bandwidth to an original value when the duplicate packets are deleted.

DETAILED DESCRIPTION OF THE EMBODIMENTS

Figure 1:
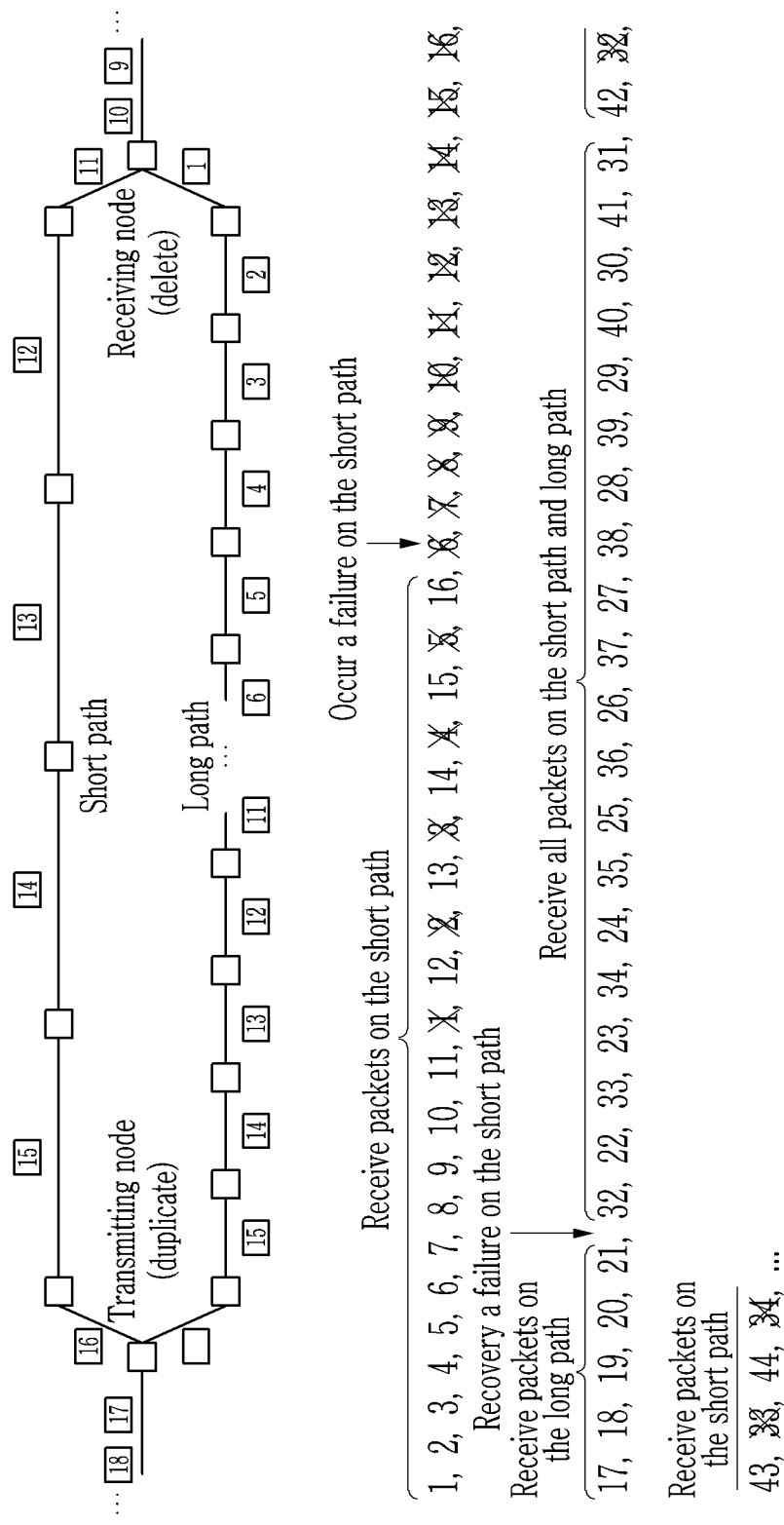
FIG. 1 is a diagram for explaining a lossless packet forwarding concept to which an embodiment of the present invention is applied.

Hereinafter, embodiments of the present invention will be described in detail with reference to the attached drawings so that a person of ordinary skill in the art may easily implement the present invention. The present invention may be modified in various ways, and is not limited thereto. In the drawings, elements that are irrelevant to the description of the present invention are omitted for clarity of explanation, and like reference numerals designate like elements throughout the specification.

Throughout the specification and claims, when a part is referred to "include" a certain element, it means that it may further include other elements rather than exclude other elements, unless specifically indicated otherwise.

Hereinafter, a method and apparatus for controlling transmission for lossless packet forwarding according to an embodiment will be described in detail with reference to the drawings.

FIG. 1 is a diagram for explaining a lossless packet forwarding concept to which an embodiment of the present invention is applied.

Referring to FIG. 1, a plurality of forwarding paths between an ingress node (hereinafter, referred to as "transmitting node") that inputs packets to the network and an egress node (hereinafter, referred to as "receiving node") that outputs packets from the network is established. In FIG. 1, for convenience of explanation, it is described that two forwarding paths are established between a transmitting node and a receiving node, and the two forwarding paths are a path with a short transfer delay time (hereinafter, referred to as "short path") and a path with a long transfer delay time (hereinafter referred to as a "long path"), and it is assumed that there is a difference by the transfer delay time corresponding to 10 packets.

The transmitting node inserts sequence numbers into the packets overhead in the order of input of the packets, duplicates the packets, and transmits them to the short path and the long path.

The receiving node checks the sequence numbers of the packets received from the short path and the long path, outputs only the packet with the sequence number that has not been already received out of the network, determines packets with the sequence number already received as duplicate packets, and deletes the packets.

Specifically, the receiving node receives packets 1 to 10 from the short path. When packet 11 is received from the short path, the receiving node sequentially receives packet 1 from the long path. The receiving node prevents duplicate transmission of the packets by deleting the packets received late from the long path through checking the sequence number of the received packets. If a failure occurs in the short path immediately after the receiving node receives the packet 16 from the short path, the receiving node determines that the packets 6 to 16 received from the long path are duplicate packets, deletes the packets 6 to 16, and determines and processes packets starting from the packet 17 as valid packets. Furthermore, if the short path failure is recovered immediately after the receiving node receives up to packet 21 from the long path, the receiving node simultaneously receives packets after packet 32 from the short path and packets after packet 22 from the long path. The receiving node determines all packets received on the short path and the long path as valid packets until packet 32 is received, so that no packet loss occurs even during path recovery. When packet 32 is received on the long path, the receiving node determines that the packets after packet 32 received on the long path are duplicate packets and deletes them.

However, as described above, when recovering from a short path failure, since the receiving node determines all packets received on the short path and the long path as valid packets until packet 32 is received, the amount of traffic doubles during the time corresponding to the difference in packet delivery delay time between the short path and the long path. Accordingly, the transmission of the corresponding traffic may be stopped by monitoring according to predefined traffic properties.

Figure 2:
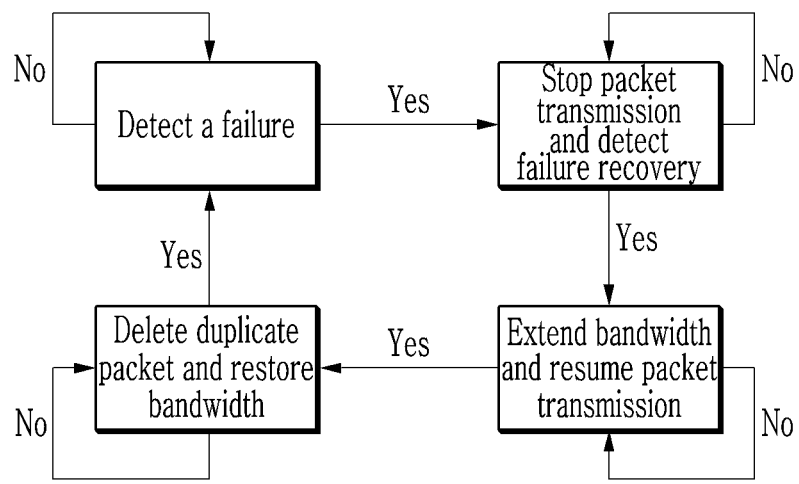
FIG. 2 is a diagram schematically illustrating a method for processing a lossless packet according to an embodiment of the present invention.

FIG. 2 is a diagram schematically illustrating a method for processing a lossless packet according to an embodiment of the present invention.

Referring to FIG. 2, in the method for processing a lossless packet for lossless packet forwarding according to an embodiment of the present invention, the problem of traffic transmission stop caused by an increase in the amount of traffic during the time corresponding to the difference in packet delivery delay time between forwarding paths is solved through a four-stage state transition.

The first stage is the state of the network before the failure, and the first step is to check whether a network failure has occurred. If network failure is detected in this step, it goes to the second step.

The second stage is a network failure state. If the failure is one of the plurality of forwarding paths for time-determined traffic forwarding, packet transmission for the failure path is stopped and whether there is a failure recovery is checked in the second stage. If the node that detects the network failure in the first stage and the node that stops packet transmission in the second stage are not the same node, the node that detects the network failure may transmit a failure occurrence notification or a signal requesting to stop packet transmission to the node that stops packet transmission. If a failure recovery is detected, it goes to the third step.

The third stage is a state in which the failure has been recovered, and the bandwidth of the node that deletes duplicate packets of the time-determined flow that stopped packet transmission is temporarily extended, and the stopped packet transmission is resumed. If the node that detects the failure recovery is not the same as the node that deletes the duplicate packet, the node that detected the failure recovery may transmit a failure recovery notification or a signal requesting bandwidth extension to the node that deletes the duplicate packet. Also, even if the node that detected the failure recovery and the node that stopped packet transmission in the second stage are not the same node, the node that detected the failure recovery may transmit a failure recovery notification to the node that stopped packet transmission. If the node that temporarily extended the bandwidth and the node that stopped packet transmission are not the same node, the node that temporarily extended the bandwidth may transmit a signal requesting packet transmission resumption to the node that stopped packet transmission to notify that the bandwidth extension is complete. When the stopped packet transmission is resumed, it goes to the fourth step.

The fourth stage is a state in which the packet transmission is resumed, which receives duplicate packets through all forwarding paths and normally performs the duplicate packet deletion function, restores the temporarily extended bandwidth to the original bandwidth, and returns to the first stage.

Figure 3:
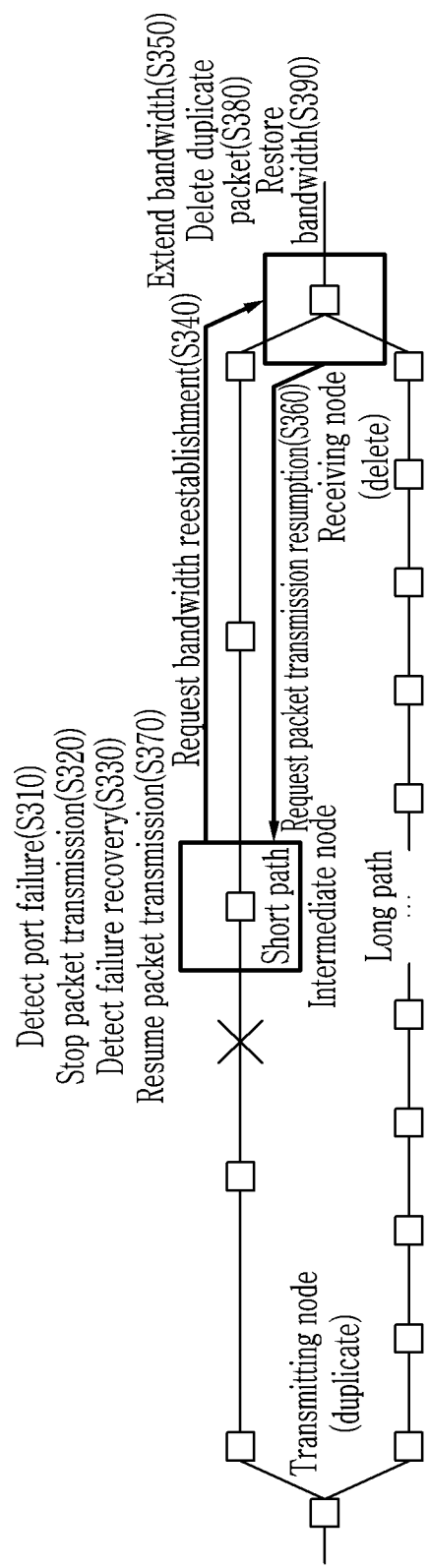
FIG. 3 is a diagram for explaining in detail a method for processing a lossless packet according to an embodiment of the present invention.

FIG. 3 is a diagram for explaining in detail a method for processing a lossless packet according to an embodiment of the present invention, and shows a case in which network failure detection, failure recovery detection, packet transmission interruption, and packet transmission resume functions are performed in the same node.

Referring to FIG. 3, when the intermediate node detects a path failure of the reception port based on a physical failure signal such as a link failure or a port failure (S310), packet transmission of the flow associated with the failed reception port is stopped (S320).

Since both the failure detection and packet transmission interruption functions are performed in the same node, failure notification or signaling requesting packet transmission stop is omitted.

When the port failure detected in the intermediate node is recovered, the intermediate node detects the failure recovery (S330), and requests a bandwidth reestablishment according to the failure recovery to the receiving node of the flow whose packet transmission is stopped due to the failure (S340).

Upon receiving the bandwidth reestablishment request from the intermediate node, the receiving node temporarily extends the bandwidth of the corresponding flow (S350) and requests the intermediate node to resume packet transmission (S360).

Upon receiving the request to resume packet transmission, the intermediate node resumes packet transmission (S370).

The receiving node normally performs the duplicate packet deletion function after a time corresponding to the transmission delay deviation on the forwarding path has elapsed (S380).

When the duplicate packet deletion function is normally performed, the receiving node restores the changed bandwidth to the originally reserved bandwidth and completes the response processing for failure recovery (S390).

In this way, when the network failure and recovery detection function and the packet transmission stop and packet transmission resumption function are performed in one node, the method for processing lossless packets for lossless packet forwarding can be equally performed even when the transmission port of the transmitting node fails and the reception port of the receiving node fails. In the case of the receiving node, it is possible to detect a failure through a network control/management function (operation and maintenance, OAM) such as an end-to-end connectivity check function rather than a physical failure signal such as a port failure signal, and a network failure and recovery detection function, packet transmission stop and packet transmission resumption functions, and bandwidth reestablishment function are all performed by the receiving node, so all signaling performed between nodes can be omitted.

Figure 4:
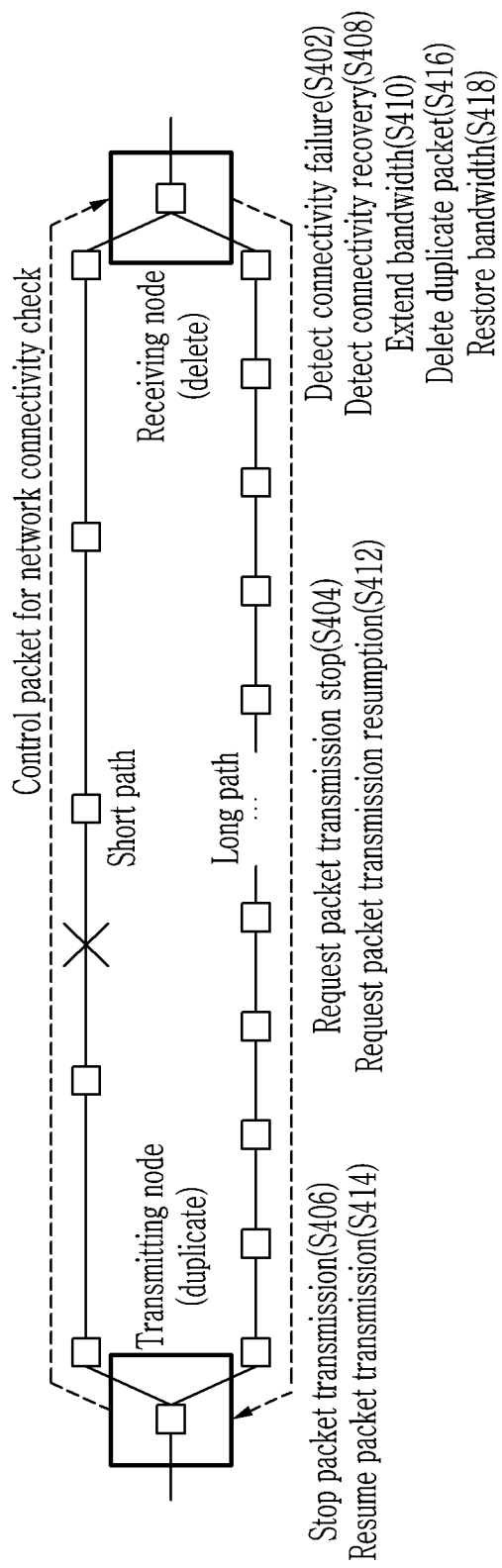
FIG. 4 is a diagram for explaining in detail a method for processing a lossless packet according to another embodiment of the present invention.

FIG. 4 is a diagram for explaining in detail a method for processing a lossless packet according to another embodiment of the present invention, and shows a case in which a network failure and recovery detection function and a packet transmission stop function and packet transmission resumption function are performed in different nodes.

Referring to FIG. 4, when a receiving node detects connectivity failure of the short path through the end-to-end connectivity check function (S402), it transmits a failure occurrence notification or a signal requesting to stop packet transmission to a transmitting node performing the packet transmission stop function (S404).

The transmitting node stops transmission of the duplicated packet on the short path for lossless packet transmission (S406), and transmits the packet only through the long path. Even if packet transmission on the short path is stopped, control packets for network control/management are continuously transmitted through the short path.

The receiving node can detect connectivity failure recovery through the connectivity check function by the control packet.

When the receiving node detects the connection failure recovery (S408), the receiving node temporarily extends the bandwidth (S410), and transmits a failure recovery notification or packet transmission resumption request to the transmitting node (S412). Since the receiving node performs failure recovery detection and bandwidth reestablishment functions, bandwidth reestablishment request signaling is omitted.

Upon receiving the failure recovery notification, the transmitting node resumes the stopped packet transmission after a sufficient time for bandwidth change has elapsed, or resumes packet transmission on the short path after receiving a packet transmission resumption request (S414).

The receiving node normally performs the duplicate packet deletion function after a time corresponding to the transmission delay deviation on the forwarding path has elapsed after recovery from the failure (S416).

When the duplicate packet deletion function is normally performed, the receiving node restores the changed bandwidth to the originally reserved bandwidth and completes the response processing for failure recovery (S418).

Figure 5:
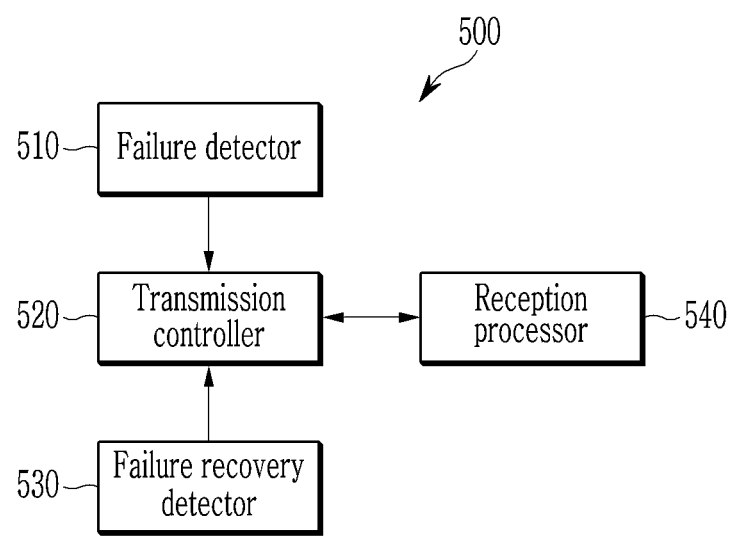
FIG. 5 is a diagram illustrating an apparatus for controlling transmission for lossless packet forwarding according to an embodiment of the present invention.

FIG. 5 is a diagram illustrating an apparatus for controlling transmission for lossless packet forwarding according to an embodiment of the present invention.

Referring to FIG. 5, the apparatus for controlling transmission for lossless packet forwarding 500 includes a failure detector 510, a transmission controller 520, a failure recovery detector 530, and a reception processor 540.

The failure detector 510 detects a network failure on the forwarding path. The failure detector 510 detects a physical failure, such as a link failure or a port failure, or detects a connectivity failure through an end-to-end connectivity check function.

When a failure is detected by the failure detector 510, the transmission controller 520 stops packet transmission transmitted through a path in which the failure is detected. When failure recovery is detected by the failure recovery detector 530, the transmission controller 520 resumes the stopped packet transmission.

The failure recovery detector 530 detects failure recovery. The failure recovery detector 530 may detect a physical state, such as a link state or a port state, or detect connectivity failure recovery through a connectivity check function using a control packet.

The reception processor 540 performs reception processing on packets received through a plurality of forwarding paths. The reception processor 540 deletes duplicate received packets through a sequence number of a packet received through each forwarding path. In addition, the reception processor 540 temporarily extends the bandwidth of a flow in which packet transmission is stopped due to the failure when the network failure is recovered and the stopped packet transmission is resumed, and processes all packets received through each forwarding path as valid packets. The reception processor 540 changes the changed bandwidth to the originally reserved bandwidth when a normally duplicate received packet is deleted after a time corresponding to the transmission delay deviation between the forwarding paths has elapsed.

As described above, the failure detector 510, the transmission controller 520, the failure recovery detector 530, and the reception processor 540 may be implemented in one node, or alternatively, may be implemented in different nodes.

Figure 6:
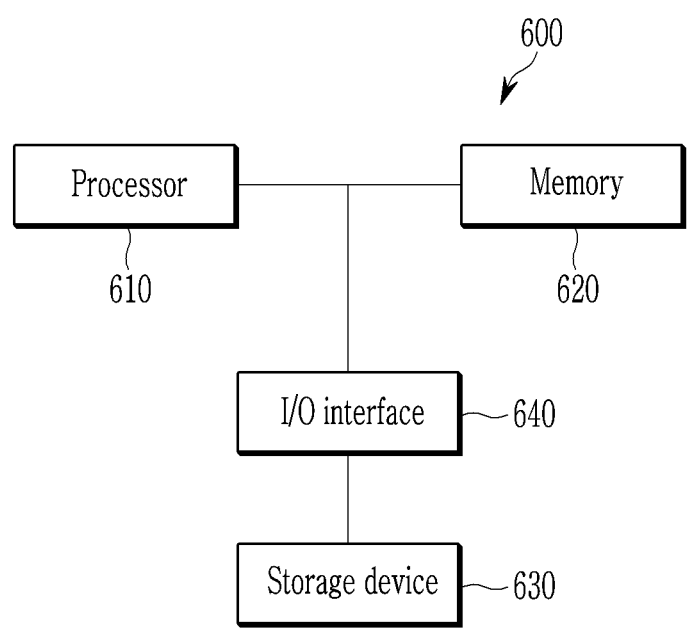
FIG. 6 is a diagram illustrating an apparatus for controlling transmission for lossless packet forwarding according to another embodiment of the present invention.

FIG. 6 is a diagram illustrating an apparatus for controlling transmission for lossless packet forwarding according to another embodiment of the present invention.

Referring to FIG. 6, the apparatus for controlling transmission for lossless packet forwarding includes a processor 610, a memory 620, a storage device 630, and an input/output (I/O) interface 640.

The processor 610 may be implemented as a central processing unit (CPU) or other chipsets, microprocessors, or the like.

The memory 620 may be implemented in a medium such as RAM, such as dynamic random access memory (DRAM), rambus DRAM (RDRAM), synchronous DRAM (SDRAM), static RAM (SRAM), etc.

The storage device 630 may be a hard disk, optical disks such as a compact disc read only memory (CD-ROM), a compact disc rewritable (CD-RW), a digital video disc ROM (DVD-ROM), a DVD-RAM, a DVD-RW disk, a blu-ray disk, etc., flash memory, or permanent or volatile storage devices such as various forms of RAM.

The I/O interface 640 allows the processor 610 and/or the memory 620 to access the storage device 630.

The processor 610 may perform bandwidth change and transmission control functions for lossless packet forwarding described with reference to FIGS. 1 to 5, may load a program command for implementing at least some functions of the failure detector 510, the transmission controller 520, the failure recovery detector 530, and the reception processor 540, and may control to perform the operation described with reference to FIGS. 1 to 5. The program command may be stored in the storage device 630 or stored in other systems connected over a network.

According to an embodiment of the present invention, by solving the discarding problem that the transmission of the corresponding packet is stopped or some packets are deleted by traffic monitoring in operation for time-determined traffic forwarding because the amount of traffic increases during failure recovery due to a difference in delivery delay time between different forwarding paths, it is possible to ensure the normal operation of the time-determined packet forwarding function and the lossless packet forwarding function.

Although the embodiments of the present invention have been described in detail above, the scope of the present invention is not limited thereto, and various modifications and improved forms of the present invention are also provided by those skilled in the art using the basic concept of the present invention as defined in the following claims are within the scope of the right.

What is claimed is:

1. A method for controlling a transmission for lossless packet forwarding in an apparatus for controlling a transmission for lossless packet forwarding in which a transmitting node duplicates packets and transmits the packets through a plurality of forwarding paths established between the transmitting node and a receiving node, and the receiving node deletes duplicate packets, the method comprising:
   when a failure is detected on one of the plurality of forwarding paths, stopping packet transmission of a flow associated with the failed path at the node detecting the failure;
   when the failed path is recovered, temporarily extending a reserved bandwidth of the flow at the receiving node;
   deleting duplicate packets from packets received at the receiving node based on sequence number of packets received as the duplicate packets; and
   resuming packet transmission of the flow associated with the failed path at the node detecting the failure by receiving packets on the plurality of forwarding paths through the extended bandwidth at the receiving node.

2. The method of claim 1, wherein the plurality of forwarding paths have different transmission delays.

3. The method of claim 1, further comprising detecting the failure based on a physical failure signal or an end-to-end connectivity check on the forwarding path.

4. An apparatus for controlling a transmission for lossless packet forwarding in which a transmitting node duplicates packets and transmits the packets through a plurality of forwarding paths established between the transmitting node and a receiving node, and the receiving node deletes duplicate packets, the apparatus comprising:
   when a failure is detected on at least one of the plurality of forwarding paths, a transmission controller that stops packet transmission transmitted to the failed path and resumes the stopped packet transmission upon recovery of the failure of the corresponding path; and when the failed path is recovered, a reception processor that temporarily extends a reserved bandwidth of a flow at the receiving node, deletes duplicate packets from packets received at the receiving node based on sequence number of packets received as the duplicate packets, and receives packets on the plurality of forwarding paths through the extended bandwidth at the receiving node.

5. The apparatus of claim 4, further comprising a failure detector that detects the failure on the plurality of forwarding paths.

6. The apparatus of claim 5, wherein the failure detector detects the failure based on a physical failure signal or an end-to-end connectivity check.

7. The apparatus of claim 4, further comprising a failure recovery detector that detects failure recovery of the path in which the failure is detected.

8. The apparatus of claim 4, wherein the reception processor deletes duplicate packets from packets received through the plurality of forwarding paths, and changes the bandwidth to an original value when the duplicate packets are deleted.

* * * * *